June 9, 1964 CARL-HERMANN HEISE 3,136,564
WHEEL AND FRAME ARRANGEMENT FOR ROAD BUILDING VEHICLE
Filed April 18, 1962 6 Sheets-Sheet 3

INVENTOR
CARL H. HEISE

BY Toulmin & Toulmin
ATTORNEYS

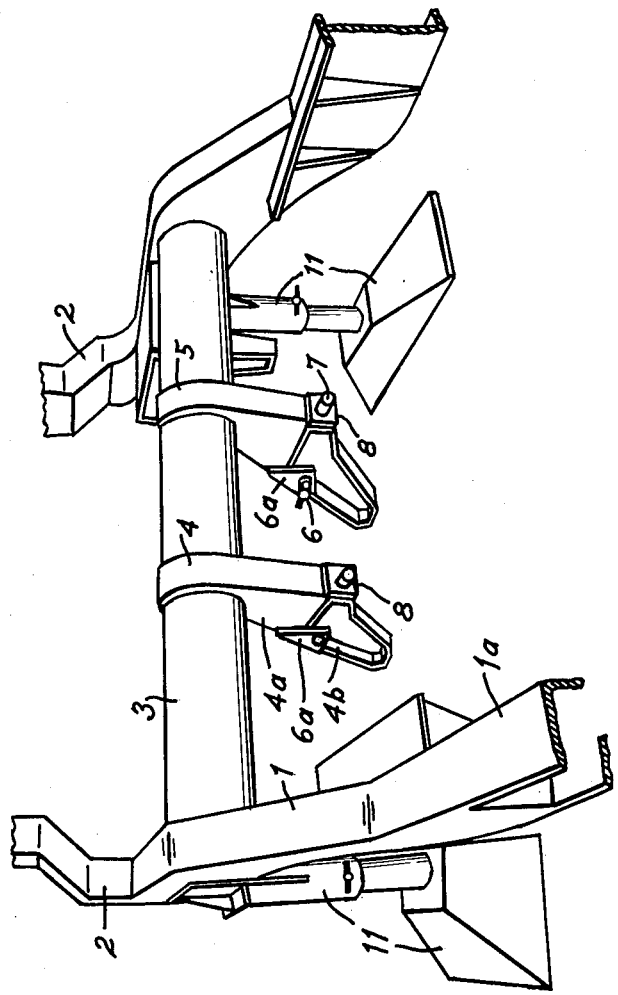

June 9, 1964  CARL-HERMANN HEISE  3,136,564
WHEEL AND FRAME ARRANGEMENT FOR ROAD BUILDING VEHICLE
Filed April 18, 1962  6 Sheets-Sheet 6
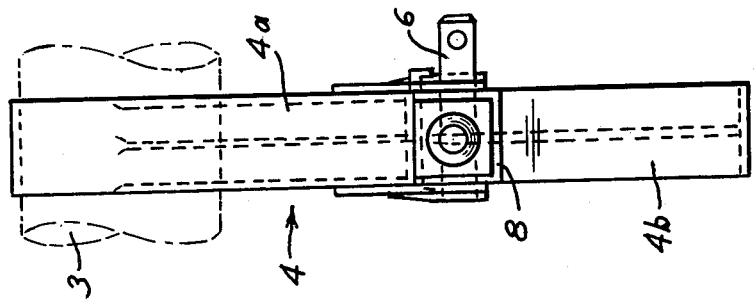
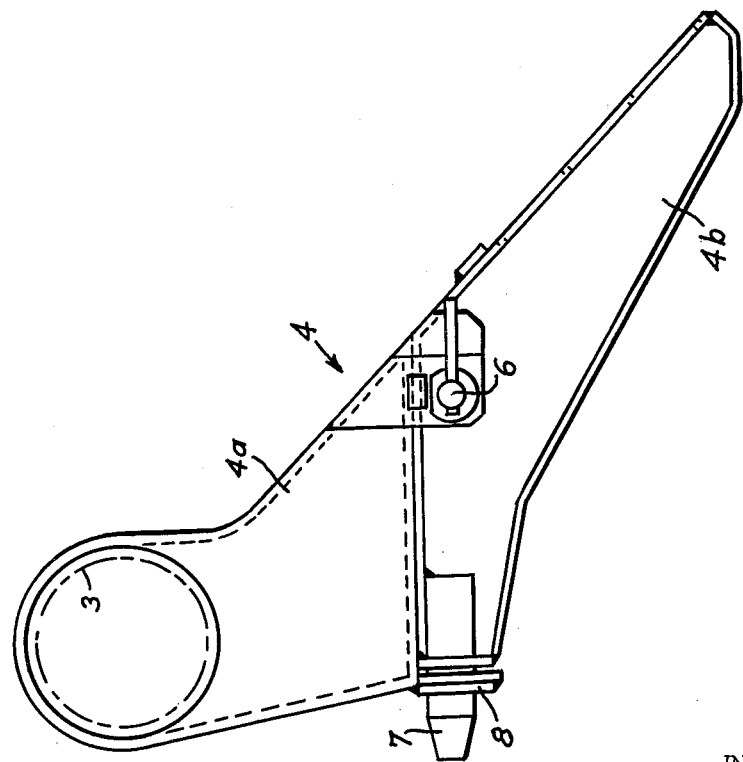
INVENTOR
CARL H. HEISE
BY Toulmin & Toulmin
ATTORNEYS

United States Patent Office 3,136,564
Patented June 9, 1964

3,136,564
WHEEL AND FRAME ARRANGEMENT FOR
ROAD BUILDING VEHICLE
Carl-Hermann Heise, 12 Kalandstrasse,
Alfeld (Leine), Germany
Filed Apr. 18, 1962, Ser. No. 188,486
Claims priority, application Germany Apr. 18, 1961
7 Claims. (Cl. 280—81)

The present invention relates to a wheeled apparatus for the preparation of bituminous road-building materials which can be transported on the road between locations, more particularly, to the structure for mounting a wheel assembly on one end of the apparatus wherein the wheel assembly can be readily detached from the apparatus when the apparatus has been mounted in a new location.

One form of an apparatus for the preparation of bituminous road-building materials comprises a drying drum, a bucket conveyor and a mixing tower all of which are mounted on the undercarriage or frame of the apparatus. The drying drum in this type of apparatus is heated in a conventional and known manner by means of an oil burner assembly which is generally positioned at the rear end of the apparatus.

Such an apparatus must have a high operating capacity in order to supply the large quantity of road-building materials required by modern road-building machinery and methods. To support such high capacity machines the underframe of the apparatus must be solidly and strongly constructed. The axle load on such an apparatus may be of the order of 20 tons. In addition, the frame and particularly the rear portion thereof with the wheel assembly must be constructed so that the machine can be moved at speeds of about 15 miles per hour.

In view of this great strength which must be built into the rear portion of the frame to withstand these great loads, the rear portion of the frame must necessarily be built of such dimensions as would impair and obstruct the operation of the oil burner of the drying drum.

It is therefore the principal object of the present invention to provide a novel and improved frame for an apparatus for the preparation of bituminous road-building materials.

It is a further object of the present invention to provide a wheel assembly for the rear portion of such an apparatus which does not interfere with the operation of the oil burner of the drying drum.

In order to attain the objects of the present invention and to eliminate the disadvantages of the prior art structures as described above, the present invention essentially comprises such an apparatus wherein the rear wheel assembly may be detached from the frame when the frame of the apparatus is supported in its operating position. The mounting of the wheel assembly is so constructed that the wheel assembly is removed from the frame by pulling the wheel assembly rearwardly out from under the frame when the frame is supported in a stationary position on its props.

The rear end of the frame in the vicinity of the oil burner is formed with an upwardly offset portion so that easy access to the oil burner is provided to the operator of the apparatus when the rear wheel assembly has been removed from the frame. Simple yet effective structure is provided for detachably securing the rear wheel assembly to the frame of the apparatus so that the assembly can be removed and replaced with relatively little effort.

Other objects and advantages of the present invention will be apparent upon reference to the accompanying description when taken in conjunction with the following drawings, wherein FIGURE 1 is a side elevational view of the rear portion of the apparatus of the present invention without the drying drum;

FIGURE 5 is a perspective view of a part of the rear of the apparatus frame viewed from the position of the drying drum and showing the supporting arms for the wheel assembly;

FIGURE 6a is a side elevational view of a supporting arm for the wheel assembly; and FIGURE 6b is a front elevational view of the supporting arm shown in FIGURE 6a.

A specific embodiment of the present invention will next be described in detail with reference to the accompanying drawings wherein like reference symbols indicate the same parts throughout the various views.

Figure 1:
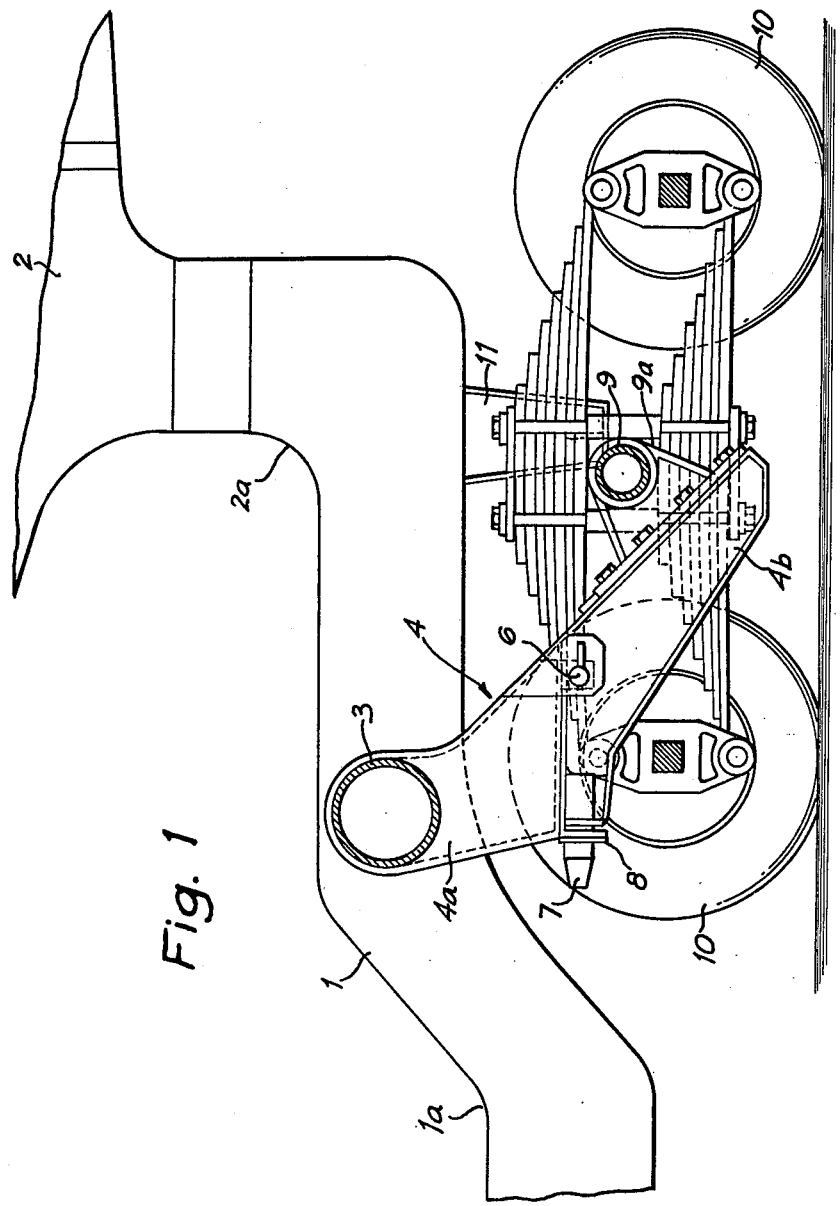
Figure 2:
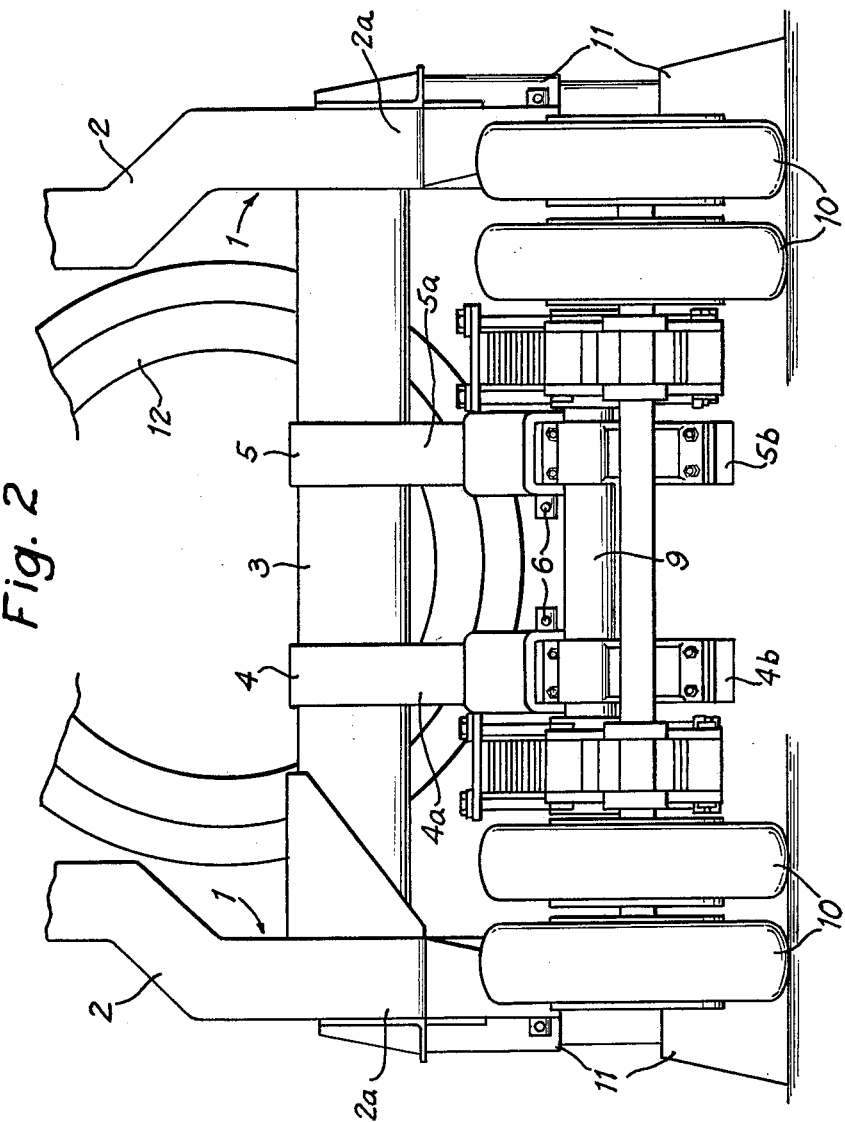
FIGURE 2 is a rear elevational view of the apparatus showing the relative positions of the rear wheel assembly and the drying drum.
Figure 3:
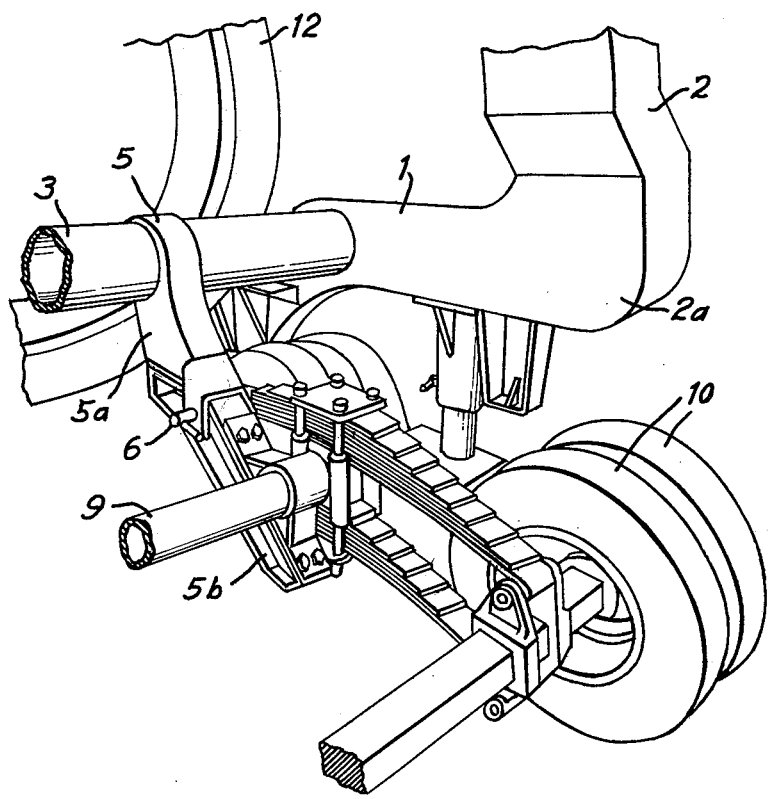
FIGURE 3 is a perspective view of a portion of the rear end of the apparatus frame showing one supporting arm to which the wheel assembly is attached.
Figure 4:
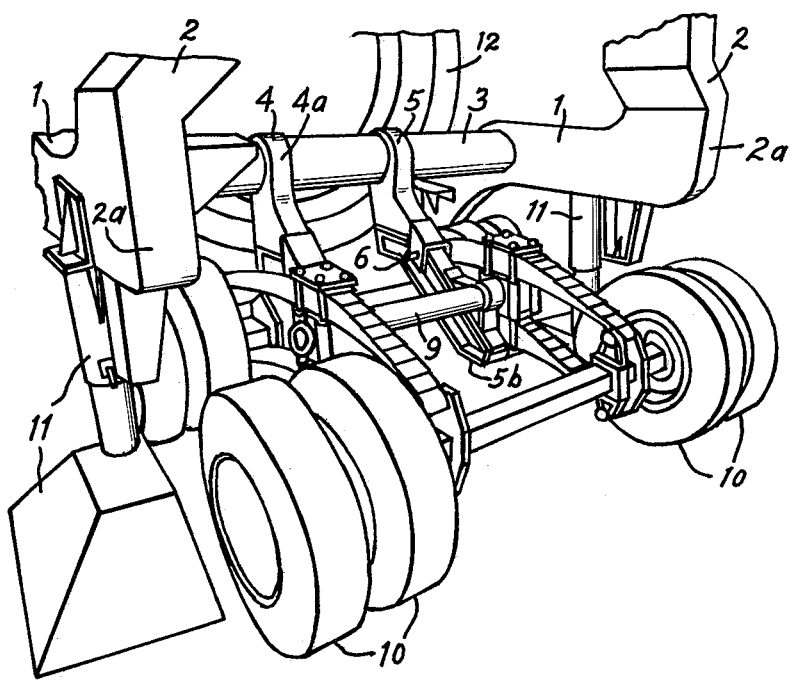
FIGURE 4 is a perspective view of the rear of the apparatus showing the two supporting arms by which the wheel assembly is secured to a cross member of the frame.

With particular reference to FIGURES 1 and 5 the frame of the apparatus of this invention comprises a pair of parallel frame members the rearward ends of which are bent upwardly at 1a to form upward offset portions 1. The ends of the frame members are again bent upwardly at 2a to form undercarriage parts 2. The upward bending of the frame members at 2a provides ready access to the heating unit of the drying drum.

There is a hollow tubular cross member 3 extending between the offset frame portions 1. A pair of supporting arms 4 and 5 have their upper ends mounted on the cross member 3. The supporting arms comprise upper portions 4a and 5a, respectively, and lower portions 4b and 5b, respectively.

The front end of the bottom of each of the upper portions 4a and 5a has a depending bracket 8 or butt strap having an aperture therethrough. The lower portions 4b and 5b are each provided with longitudinally extending guide bolts or pins 7 which have tapered ends to facilitate insertion in the apertures of the brackets 8.

The rear portions of each of the upper supporting arms 4a and 5a are provided with U-shaped brackets 6a which have apertures in the legs thereof. A bolt or pin 6 passes through the apertured legs of the bracket 6a and through an aperture in the lower supporting arm portions to secure the upper and lower supporting arm portions to each other.

Each of the supporting arms 4 and 5 forms an angle of about 45° with a vertical axis passed through the tubular cross member 3. This relationship is best shown in FIGURES 1 and 6a.

Brackets 9a are mounted on each of the lower supporting arm portions 4b and 5b and support an axle or shaft 9 of a double-axle wheel assembly consisting of four double wheels 10.

As is conventional with such road-building materials apparatus, props 11 are mounted on the frame so as to support the apparatus in a stationary position when it is desired to place the apparatus in operation.

The drying drum of the apparatus is indicated at 12.

When the apparatus is first transported to its new location, the wheel assembly is in the position as seen in FIGURE 1. The props 11 are then lowered to support the frame in a stationary and somewhat raised position with a clearance between the wheels and the ground surface. As is conventional, the props 11 are also provided with a suitable jack structure to raise the frame.

After positioning the frame, the pins 6 are then pulled outwardly in a transverse direction and the wheel assembly is then pulled rearwardly of the apparatus out from under the offset frame portion 1. Moving of the wheel assembly in this direction disengages the guide pins 7 from their respective brackets 8.

Regardless of the overall dimensions and size of the double-axle wheel assembly, the assembly can be easily reattached to the frame merely by moving the wheel assembly under the offset frame portion 1 in a longitudinal direction with respect to the apparatus frame. The tapered ends of the guide bolts 7 are guided into the apertures of the brackets 8 and the pins 6 are then passed through the brackets 6a and the lower supporting arm portions to fixedly secure the supporting arm portions together.

Thus it can be seen that the present invention provides a mounting for a wheel assembly wherein the wheel assembly can be readily removed from the undercarriage of the apparatus after the apparatus has been transported to its operating position. In addition, the fastening means between the wheel assembly and the frame greatly facilitates the procedure in reattaching the wheel assembly to the frame when it is desired to transport the apparatus to a new location. By removing the wheel assembly from the frame, the operator of the apparatus has free and unlimited accessability to the heater unit for heating the drying drum. The mounting of this wheel assembly can be readily used for various sizes of wheel assemblies. Thus, the size and capacity of the apparatus for the preparation of bituminous road-building materials will not affect in any manner the utilization of this invention.

It will be understood that this invention is susceptible to modification in order to adapt it to different usages and conditions and, accordingly, it is desired to comprehend such modifications within this invention as may fall within the scope of the appended claims.

What is claimed as this invention is:

1. In an apparatus for the preparation of bituminous road-building materials, the combination of a frame comprising a pair of parallel members with each member having an upwardly offset portion on one end thereof, a cross member between and rigidly secured to said frame members at said offset portions, a pair of downwardly extending upper supporting arms secured to said cross member, a pair of lower supporting arms extending from the lower ends of said upper supporting arms respectively, a bracket depending from the forward portion of the lower end of each upper supporting arm and having an aperture therethrough, a longitudinally extending bolt on the upper end of each lower supporting arm and insertable into said apertured bracket, means for securing said upper and lower supporting arms together after said bolt has been inserted in said apertured bracket, a transverse axle carried by said lower supporting arms, and a wheel assembly carried by said axle.

2. The apparatus of claim 2, in which the wheel assembly comprises two wheel-carrying axles, one being in front of and the other behind the transverse axle.

3. In an apparatus for the preparation of bituminous road-building materials, the combination of a frame comprising a pair of parallel members with each member having an upwardly offset portion on one end thereof, a cross member between and rigidly secured to said frame members at said offset portions, a pair of downwardly extending upper supporting arms secured to said cross member, a pair of lower supporting arms extending from the lower ends of said upper supporting arms respectively, a bracket depending from the forward portion of the lower end of each upper supporting arm and having an aperture therethrough, a longitudinally extending bolt on the upper end of each lower supporting arm and insertable into said apertured bracket, a U-shaped bracket depending from the rearward portion of said lower end of each upper supporting arm and having apertures in both legs thereof, a transversely extending removable bolt passing through said apertured U-shaped bracket and said lower supporting arm to detachably secure said upper and lower supporting arms together, a transverse axle carried by said lower supporting arms, and a wheel assembly carried by said axle.

4. The apparatus of claim 3, in which the wheel assembly comprises two wheel-carrying axles, one being in front of and the other behind the transverse axle.

5. In an apparatus for the preparation of bituminous road-building materials, the combination of a frame comprising a pair of parallel members with each member having an upwardly offset portion on one end thereof, a tubular cross member between said frame members at said offset portions, a pair of downwardly extending upper supporting arms mounted on said cross member, a pair of lower supporting arms extending from the lower ends of said upper supporting arms respectively, means for detachably mounting said lower supporting arms on the lower ends of said upper supporting arms so that said lower supporting arms can be readily removed when the apparatus is mounted in position and reattached to said upper supporting arms when the apparatus is to be moved to a new location, and a two-axle wheel assembly having a transversely extending member mounted on said lower supporting arms.

6. In an apparatus for the preparation of bituminous road-building materials, the combination of a frame comprising a pair of parallel members with each member having an upwardly offset portion on one end thereof, a hollow cross member between and rigidly secured to said frame members at said offset portions, a pair of downwardly extending upper supporting arms secured to said cross member, a pair of lower supporting arms extending downwardly and rearwardly from the lower ends of said upper supporting arms respectively, means for detachably mounting said lower supporting arms on the lower ends of said upper supporting arms so that said lower supporting arms can be readily removed when the apparatus is mounted in position and reattached to said upper supporting arms when the apparatus is to be moved to a new location, each of said lower supporting arms forming an angle of about 45° with a vertical axis passing through said tubular cross member, a transverse axle carried by the lower supporting arms, and a wheel assembly carried by the transverse axle.

7. The apparatus of claim 6 in which the wheel assembly comprises two wheel-carrying axles, one being in front of and the other behind the transverse axle.

References Cited in the file of this patent

UNITED STATES PATENTS

| | | |
|---|---|---|
| 1,606,995 | Hines | Nov. 16, 1926 |
| 1,936,834 | Fageol | Nov. 28, 1933 |
| 2,078,521 | Alden | Apr. 27, 1937 |
| 2,229,653 | Hohl | Jan. 28, 1941 |
| 2,463,647 | Schuette | Mar. 8, 1949 |
| 2,535,283 | Groom | Dec. 26, 1950 |
| 2,682,420 | Chelf | June 29, 1954 |
| 2,760,784 | Talbert et al. | Aug. 28, 1956 |
| 2,833,187 | Wells | May 6, 1958 |